(No Model.)
R. H. LEE.
LEVELING DEVICE.
No. 392,209. Patented Nov. 6, 1888.
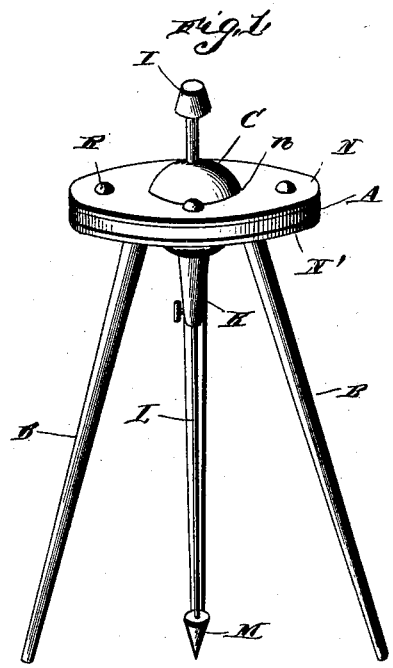
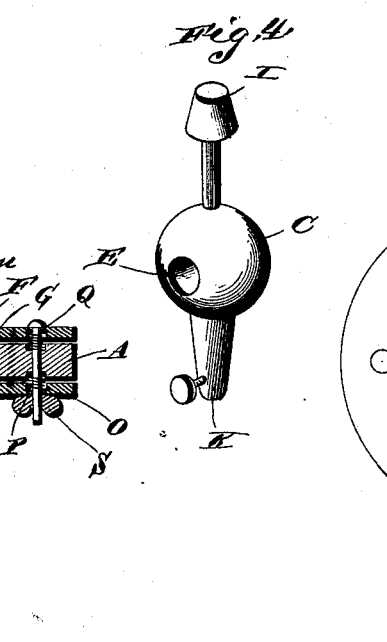
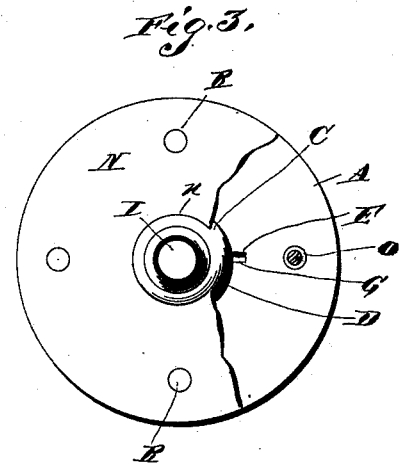
Witnesses.
R. P. Taylor
C. E. Doyle
Inventor,
R. H. Lee,
By his Attorneys

UNITED STATES PATENT OFFICE.

RICHARD HENRY LEE, OF MARYSVILLE, KANSAS.

LEVELING DEVICE.

SPECIFICATION forming part of Letters Patent No. 392,209, dated November 6, 1888.

Application filed June 14, 1888. Serial No. 277,051. (No model.)

*To all whom it may concern:*

Be it known that I, RICHARD HENRY LEE, a citizen of the United States, residing at Marysville, in the county of Miami and State of Kansas, have invented a new and useful Improvement in Leveling Devices, of which the following is a specification.

My invention relates to a leveling device or tripod-head for compasses, theodolites, transits, plane-tables, and other surveying-instruments in which it is necessary to obtain a perfect level and it is desirable to accomplish the same as rapidly and with as little risk of error as possible; and it consists in a certain novel construction and arrangement of devices fully set forth hereinafter in connection with the accompanying drawings, wherein—

Figure 1 is a perspective view of a tripod provided with the improved leveling device. Fig. 2 is a vertical central sectional view of the same. Fig. 3 is a plan view of the same, partly broken away. Fig. 4 is a detail view of the ball having the conical tenon attached thereto.

Referring to the drawings, A designates the table or cap, to the under side of which are affixed the upper ends of the tripod-legs B B, and C designates the leveling-ball, (perfectly spherical in shape,) which fits snugly in the central circular opening, D, in the said table or cap. This ball is provided with a transverse opening, E, through which passes the horizontal bar F, having a central socket, $f$, and fitting at its ends in depressions G G in the table or cap on opposite sides of the opening therein. The parts are so arranged that the socket $f$ in this bar is arranged accurately at the center of the opening D, and also at the center of the thickness of the table or cap, and a vertical spindle or needle, H, depends from the upper side of the opening E in the ball and bears in this socket $f$, the pointed lower end of the said spindle or needle being adjusted accurately at the center of the ball C.

The upper side of the ball C is provided with a rigid conical tenon, I, which is adapted to fit in a suitable socket in the compass or other instrument to which the level is applied. (This socket and instrument are not shown in the drawings, as they form no part of the invention, and may be of any ordinary or well-known construction.)

K designates a tubular arm or socket, which depends from the ball C and is diametrically aligned with the tenon I, and in this tubular arm or socket is adjusted the upper end of the inflexible rod L, having a plumb bob, M, on its lower end.

It will now be seen that the leveling-ball is suspended freely in the table or cap, and therefore when the plumb-bob is released the tenon I will assume a perfectly-vertical position, so that the compass or other instrument which is mounted thereon is accurately leveled without the chance of an error due to the inaccuracy of the eye of the operator, as there is when the leveling is accomplished by means of spirit-levels or similar devices.

N N' denote clamping-plates arranged, respectively, on the upper and lower sides of the table or cap, and provided at their centers with the openings $n$ $n'$ to receive the upper and lower sides of the ball, the said openings being concaved or hollowed out to snugly fit the ball. The contiguous faces of the table or cap and the clamping-plates are provided with registering sockets O O, in which are seated coiled springs P P, which are adapted to automatically force the clamping-plates away from the table or cap when the plates are released, and Q Q represent registering apertures in the said clamping-plates and the table or cap, in which are arranged the vertical bolts R R, engaged at their lower ends by the thumb-nuts S S, which bear against the lower side of the lower clamping-plate. When the said thumb-nuts are tightened, the clamping-plates are drawn toward each other and the concave openings therein bind the opposite faces of the ball, and thus clamp it in any desired position; but when the said nuts are loosened the springs P P repress the clamping-plates and release the said ball, which then swings freely and will assume a position in which the tenon I is vertical.

It will be seen that this leveling device is positively accurate, for the reason that it depends upon the principle that a plumb-rod when suspended freely assumes a vertical position, and therefore as soon as the tripod is placed on the ground it is only necessary to tighten the clamping-nuts and the leveling operation is completed.

Having described my invention, I claim—

1. The combination, with the table or cap having a central opening, of the adjustable clamping-plates on the upper and lower sides of the said table or cap and provided with concave central openings registering with the opening in the table or cap, and the ball mounted in the said openings and having a plumb-bob suspended from its lower side by an inflexible rod, whereby the ball is automatically adjusted, substantially as specified.

2. The combination, with the table or cap having a central opening, of the transverse bar arranged in the said opening and provided with a central socket, $f$, the ball arranged in the said opening and having a transverse opening, E, the spindle or needle depending from the upper side of the opening E and bearing in the socket $f$, the plumb-bob suspended from the said ball, and means to clamp the ball in the desired position, substantially as specified.

3. The combination of the table or cap having a central opening, D, and depressions G G on opposite sides of the said opening, the transverse bar F, arranged at its ends in the said depressions and provided with a central socket, $f$, the ball C, arranged in the opening D and provided with a transverse opening, E, embracing the bar F, the conical tenon on the upper side of the ball, the depending tubular arm or socket K, having the upper end of a plumb-rod engaged therein, and the depending spindle or needle in the ball bearing in the socket $f$, substantially as specified.

4. The table or cap having a central opening, D, the clamping-plates arranged on the upper and lower sides of the table or cap, and provided with registering openings $n\ n'$, the bolts arranged in registering apertures in the said table or cap and the clamping-plates, and the thumb-nuts on the ends of the said bolts, in combination with the ball freely mounted in the registering openings D $n\ n'$ and provided with a depending plumb-rod, substantially as specified.

5. The table or cap having a central opening, D, the clamping-plates arranged on the upper and lower sides of the said table or cap and provided with openings $n\ n'$, registering with the opening D, the springs arranged between the said clamping-plates and the table or cap, and the adjusting-bolts arranged in registering apertures in the table or cap and the clamping-plates and provided with thumb-nuts engaging their free ends, in combination with the ball C, suitably and freely mounted in the registering openings D $n\ n'$ and having a plumb-rod attached thereto, all substantially as and for the purpose specified.

In testimony that I claim the foregoing as my own I have hereto affixed my signature in presence of two witnesses.

RICHARD HENRY LEE.

Witnesses:
JABEZ H. NIXON,
JOHN R. SKINNER.